United States Patent [19]

Dalton

[11] 4,084,447
[45] Apr. 18, 1978

[54] VALVE ACTUATOR

[75] Inventor: Thomas B. Dalton, Muskegon, Mich.

[73] Assignee: Westran Corporation, Muskegon, Mich.

[21] Appl. No.: 672,839

[22] Filed: Apr. 1, 1976

[51] Int. Cl.² .............................................. F16H 27/02
[52] U.S. Cl. ...................................... 74/89.14; 74/425
[58] Field of Search ............ 74/89.14, 425, 424.8 VA, 74/89.15

[56] References Cited

U.S. PATENT DOCUMENTS

| | | | |
|---|---|---|---|
| 2,747,426 | 5/1956 | Robinson | 74/425 |
| 3,277,678 | 10/1966 | Booth | 74/89.14 |
| 3,473,397 | 10/1969 | Fry | 74/424.8 VA |
| 3,797,324 | 3/1974 | Sheesley et al. | 74/89.15 |

Primary Examiner—Benjamin W. Wyche
Assistant Examiner—Wesley S. Ratliff, Jr.
Attorney, Agent, or Firm—Gifford, Chandler, VanOphem, Sheridan & Sprinkle

[57] ABSTRACT

A valve actuator is provided for use with a valve having an actuator shaft the rotation of which actuates the valve. The valve actuator comprises a housing having a worm gear rotatably mounted in the housing and wherein the worm gear includes a shaft portion extending externally of the housing so that a handle may be secured thereto. A segmented gear having an axis of rotation generally perpendicular to the worm gear axis, is also rotatably mounted within the housing and is positioned to mesh with the worm gear so that rotation of the worm gear produces a like rotation of the segmented gear. The segmented gear includes means for securing the actuator shaft thereto and an indicator is secured to the segmented gear and is visible exteriorly of the housing to indicate the rotational position of the segmented gear to thereby indicate the degree of opening of the valve. In addition, preferably adjustable stop members are provided in the housing to limit the rotational travel of the segmented gear.

4 Claims, 3 Drawing Figures

VALVE ACTUATOR

BACKGROUND OF THE INVENTION

I. Field of the Invention

The present invention relates generally to valve actuators and, more particularly, to a valve actuator utilizing a worm gear and segmented gear driving arrangement.

II. Description of the Prior Art

A plurality of valve actuators utilizing a worm gear and segmented gear driving arrangement have been previously known in the trade. These previously known valve actuators, however, suffer several disadvantages unknown to the present invention.

One disadvantage of such valve actuators is that both the worm gear and the segmented gear are exposed to the elements not only during assembly of the valve actuator onto the valve but also after the final assembly has been completed. Such exposure not only permits damage to the internal workings of the valve actuator, but also requires periodic and frequent lubrication of the valve actuator. Moreover, the accumulation of foreign debris within these valve actuators has in the past, necessitated periodic maintenance and cleaning.

Another disadvantage of these valve actuators is that no accurate and easily accessible means have been heretofore known to limit the rotational travel of the segmented gear and hence of the valve actuator shaft. Consequently, when it is desirable to actuate the valve actuator shaft only within desired predetermined rotational limits, these valve actuators have proven inadequate.

A still further disadvantage of such valve actuators is that none have included indicator means visible exteriorly of the valve actuator to indicate the rotational position of the valve actuator, and hence the degree that the valve is open or closed. As a result of this, when it has been desirable to open or close the valves a predetermined amount, the degree of valve actuation has heretofore been a matter of guesswork.

SUMMARY OF THE PRESENT INVENTION

The valve actuator of the present invention overcomes the above mentioned disadvantages of the previously known valve actuators by providing a valve actuator having a worm gear and a segmented gear driving arrangement in which the internal components of the valve actuator are enclosed by and protected from the environmental elements. In addition adjustable stop means are provided to limit the rotational movement of the segmented gear in both rotational directions and an indicator visible exteriorly of the housing provides a visual indication of the rotational position of the segmented gear, and hence the valve actuator shaft.

In brief, the valve actuator of the present invention comprises a worm gear rotatably mounted within a housing and having a shaft portion extending externally of the housing so that a handle may be secured thereto. A segmented gear is also rotatably mounted within the housing with its rotational axis generally perpendicular to the rotational axis of the worm gear and spaced from the worm gear so that the worm gear meshingly engages the segmented gear. The valve actuator shaft is received within the segmented gear and is secured thereto so that rotation of the worm gear effects the rotation of both the segmented gear and the valve actuator shaft.

A pair of adjustable stop members are secured to the housing and are easily accessible from outside the housing. One stop member is adapted to abut against one end tooth of the segmented gear at a predetermined rotational position of the segmented gear while the other stop member is adapted to abut against the other end tooth of the segmented gear at a different rotational position of the segmented gear so that the stop members in combination limit the total rotational travel of the segmented gear. In addition, an indicator is secured to the segmented gear and is visible exteriorly of the housing. With proper indicia imprinted on the housing, the indicator provides a constant visual indication of the rotational position of the segmented gear and hence of the valve actuator shaft.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which.

DESCRIPTION OF THE PREFERRED EMBODIMENT

Figure 1:
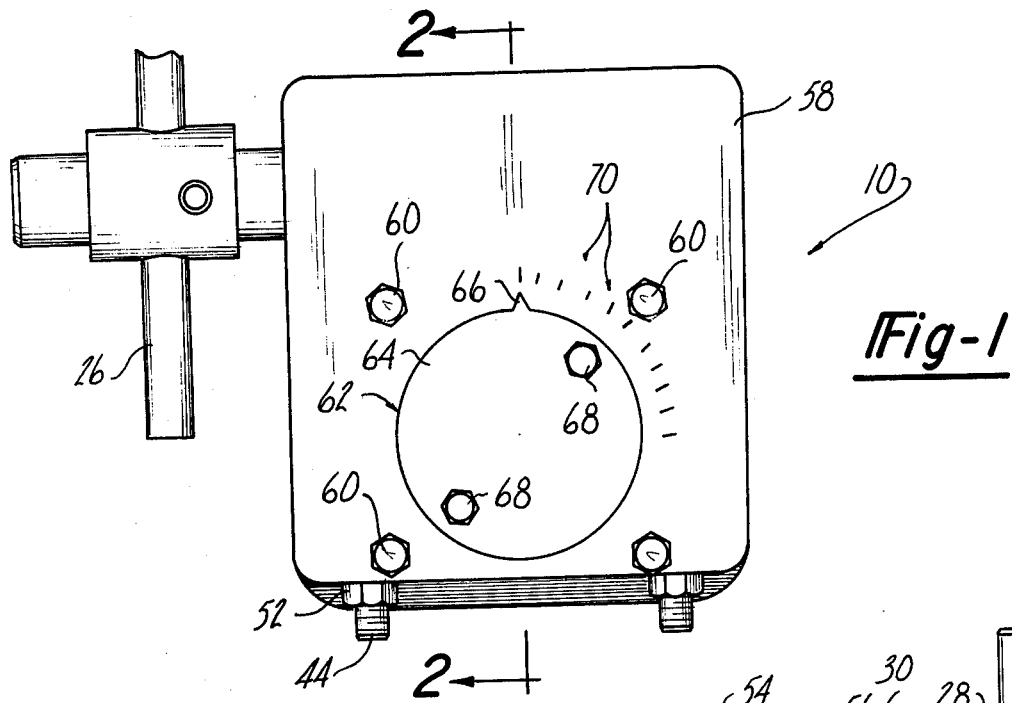
FIG. 1 is a side plan view showing the valve actuator of the present invention.

With reference to the drawing, the valve actuator 10 of the present invention is there shown having a housing 12 and adapted to effect rotation of a valve actuator shaft 14 in a manner to become hereinafter apparent. The actuator shaft is coupled to a valve (not shown) so that rotation of the actuator shaft 14 actuates the valve mechanism.

A worm gear 16 is secured by a transverse roll pin 18 to an elongated shaft 20 having a portion 22 extending exteriorly of the housing 12. The shaft 22 is mounted for rotation in the housing 12 by means of roller bearings 24 or the like. In addition, as shown in FIGS. 1 and 2, a handle 26 is secured to the outwardly extending portion 22 of the shaft 20 so that rotation of the handle 26 effects a like rotation of the worm gear 16.

Figure 2:
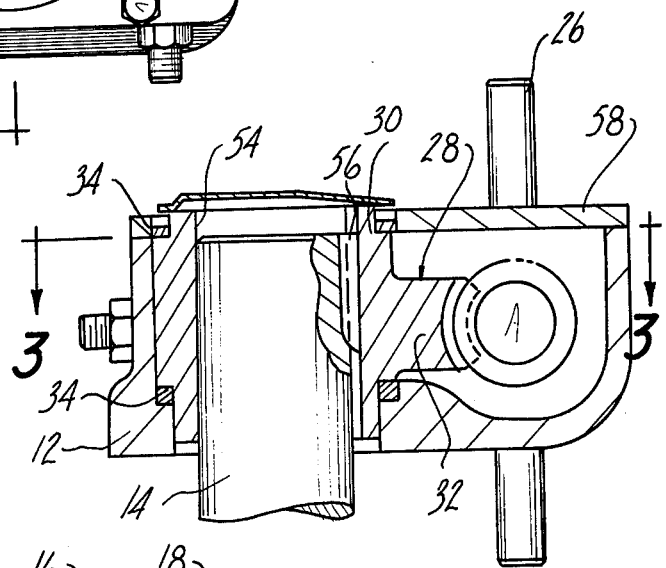
FIG. 2 is a rotated cross-sectional view of the valve actuator of the present invention taken substantially along line 2—2 in FIG. 1.
Figure 3:
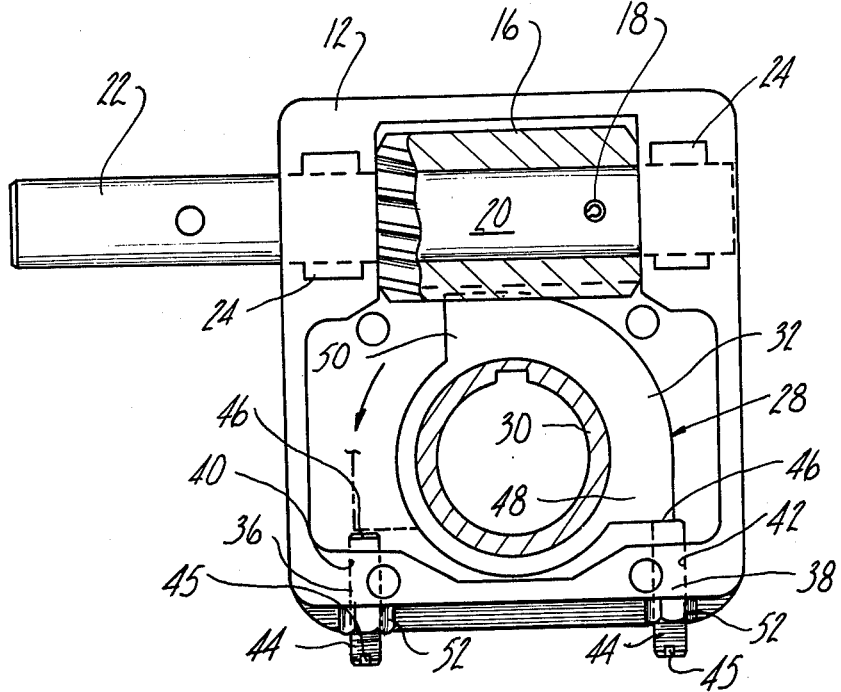
FIG. 3 is a rotated cross-sectional view of the valve actuator of the present invention taken substantially along 3—3 in FIG. 2.

Referring now to FIGS. 2 and 3, a segmented gear 28 having a hub 30 and a gear portion 32, preferably integral with each other, is also rotatably mounted within the housing 12. The axis of rotation of the segmented gear 28 is perpendicular to and spaced from the axis of rotation of the worm gear 16 so that the segmented gear 28 is in mesh with the worm gear 16 and accordingly rotation of the worm gear 16 effects rotation of the segmented gear 28. In addition in the preferred form of the invention, the segmented gear 28 is rotatably mounted by bushings 34 within the housing 12.

In order to limit the rotational travel of the segmented gear 28, a pair of externally threaded stop members 36 and 38 threadably engage threaded bores 40 and 42 respectively through the housing 12. Each stop member 36 and 38 includes a portion 44 with a slot 45 extending exteriorly of the housing 12 for easy access and adjustment of the stop members 36 and 38 and also includes an abutment surface 46 positioned internally of the housing 12. Both of the stop members 36 and 38 are positioned through the base of the housing 12 so that the abutment surfaces 46 are spaced from the rotational axis of the segmented gear 28 at a distance greater than the outer diameter of the hub 30 but less than the outside radius of the gear portion 32. Consequently, as shown in FIG. 3, with extreme clockwise rotation of the segmented gear 28, the abutment surface 46 of the stop member 38 abuts against one end tooth 48 of the gear portion 32 and thereby limits the clockwise rotation of the segmented gear 28. Conversely, upon extreme counter-clockwise rotation of the segmented gear 28, the abutment surface 46 of the stop member 36 abuts against the other end tooth 50 of the gear portion 32 and thereby limits the counter-clockwise rotational travel of the segmented gear 28. As should be apparent, the exact rotational limits of the segmented gear 28 may be adjusted by rotation of the stop members 36 and/or 38 with a screwdriver or the like and lock nuts 52 prevent further rotation of the stop members 36 and 38 when the proper setting is obtained.

In order to secure the segmented gear 28 to the actuator shaft 14, the segmented gear hub 30 preferably includes an axial bore 54 so that the actuator shaft 14 may be received within the hub bore 54. A key 56, such as a Woodruff key, is then positioned between appropriate slots in the actuator shaft 14 and the hub 30 to lock the actuator shaft 14 against rotation relative to the hub 30. Other conventional means, however, may be utilized to lock the segmented gear 28 to the actuator shaft 14. For example, the actuator shaft 14 may be squared off at its end and likewise the hub bore 54 may have a square cross-sectional shape to receive the actuator shaft 14 therein.

In order to protect the internal workings of the valve actuator 10 from damage and also to prevent the accumulation of dirt and debris within the housing 12, a cover plate 58 is positioned over the housing 12 and is secured thereto by bolts 60 or the like. Appropriate sealing means (not shown) may also be provided between the cover plate 58 and the housing 12 if desired.

An indicator 62, comprising a circular plate 64 with an indicator pointer 66 at a position along the periphery of the plate 64, is secured coaxially to the segmented gear hub 30 by any appropriate means, such as bolts 68. Thus, by imprinting proper indicia 70 upon the outwardly facing surface of the cover plate 58, the indicator pointer 66 will indicate the precise rotational position of the segmented gear 28 and hence of the valve actuator shaft 14 to thereby give an accurate indication of the degree of opening or closing of the valve.

It can thus be seen that the present invention discloses a valve actuator which is not only compact and rugged in construction but also which is relatively inexpensive to manufacture. In addition, the adjustable stop members provide a simple and yet efficient means for limiting the rotational travel of the segmented gear and hence of the valve actuator shaft.

Moreover, by the provision of the indicator, the precise position and degree of valve actuation is visibly indicated exteriorly of the housing. It should also be apparent that the valve may be actuated to a predetermined setting by merely rotating the handle 26 until the indicator pointer 66 points to the desired predetermined valve setting.

Having thus described my invention, many modifications thereto will become apparent to those skilled in the art to which it pertains without deviation from the spirit of the invention as defined by the scope of the appended claims.

What is claimed is:

1. A valve actuator for use with a valve having an actuator shaft the rotation of which actuates the valve, said valve actuator comprising a housing, a worm gear mounted for rotation in said housing, said worm gear having a shaft portion extending externally of said housing, a segmented gear mounted for rotation in said housing along an axis substantially perpendicular to and spaced from the axis of rotation of said worm gear so that said segmented gear meshes with said worm gear, means for securing said actuator shaft to said segmented gear, and two elongated stop members threadably engaged in threaded bores in said housing so that the longitudinal axis of each stop member is substantially perpendicular to rotational axis of said segmented gear and so that a first axial end of each stop member is accessible exteriorly of said housing while the second axial end of each stop member is positioned interiorly of said housing whereby the axial position of the second axial ends of said stop members can be adjusted by rotation of said stop members, and wherein the second end of one stop member is adapted to abut against one of the outer teeth of said segmented gear at the extreme rotational travel of said segmented gear in one direction to thereby limit the rotation of said segmented gear in said last mentioned direction, and wherein the second end of the other stop member is adapted to abut against the other outer tooth of said segmented gear at the extreme rotational travel of said segmented gear in the other direction to thereby limit the rotation of said segmented gear in the last mentioned direction.

2. The valve actuator defined in claim 1 and including means disposed exteriorly of said valve actuator for indicating the rotated position of said actuator shaft to thereby indicate the degree of opening of said valve.

3. The valve actuator as defined in claim 2 and in which said indicating means is operably connected with said segmented gear.

4. The invention as defined in claim 3, and including indicator means secured to said segmented gear and visible exteriorly of said housing, wherein said indicator means are adapted to indicate the rotational position of said segmented gear.

* * * * *